(12) United States Patent
Sasaki et al.

(10) Patent No.: US 10,553,174 B2
(45) Date of Patent: Feb. 4, 2020

(54) DISPLAY DEVICE AND POWER SUPPLY CONTROL METHOD THEREFOR

(71) Applicant: SHARP KABUSHIKI KAISHA, Sakai, Osaka (JP)

(72) Inventors: Takashi Sasaki, Sakai (JP); Kohji Nagasaka, Sakai (JP); Kazumasa Hata, Sakai (JP); Hiroto Suzuki, Sakai (JP); Satoru Sagawa, Sakai (JP); Ryohhei Matsumoto, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 82 days.

(21) Appl. No.: 15/743,410

(22) PCT Filed: Aug. 19, 2016

(86) PCT No.: PCT/JP2016/074174
§ 371 (c)(1),
(2) Date: Jan. 10, 2018

(87) PCT Pub. No.: WO2017/033844
PCT Pub. Date: Mar. 2, 2017

(65) Prior Publication Data
US 2018/0204533 A1    Jul. 19, 2018

(30) Foreign Application Priority Data
Aug. 27, 2015  (JP) ................. 2015-167380

(51) Int. Cl.
*G09G 5/00*    (2006.01)
*G09G 3/36*    (2006.01)
(Continued)

(52) U.S. Cl.
CPC ....... *G09G 3/3688* (2013.01); *G02F 1/13306* (2013.01); *G06F 1/28* (2013.01);
(Continued)

(58) Field of Classification Search
CPC ...... G09G 3/20; G09G 3/2085; G09G 3/3233; G09G 3/325; G09G 3/36; G09G 3/3611;
(Continued)

(56) References Cited

U.S. PATENT DOCUMENTS 6,236,393 B1   5/2001  Ogawa et al.
6,310,607 B1  10/2001  Amemiya
(Continued)

FOREIGN PATENT DOCUMENTS

JP   H11-194737 A    7/1999
JP   H11-338635 A   12/1999
(Continued)

OTHER PUBLICATIONS

Translation of JP2012-173598 A, Sep. 2012, 23 pages.*
Translation of JP2012-053173 A, Mar. 2012, 34 pages.*

*Primary Examiner* — Joe H Cheng
(74) *Attorney, Agent, or Firm* — ScienBiziP, P.C.

(57) ABSTRACT

In a display device in which source lines on a display panel are driven from both ends, when a connection confirmation signal (S2) output from a source board (13) indicates abnormality, a power supply circuit (18) on a control board (12) stops outputting a power supply voltage (Va) used when source drivers drive the source lines. The control board (12) outputs a high-level connection confirmation signal (S1) to the source board (13), the source board (13) outputs the connection confirmation signal (S1) to the control board (12) as the connection confirmation signal (S2), and the control board (12) pulls down the connection confirmation signal (S2) to a low level. With this, it is possible to prevent serious damage from occurring even when a connection failure or the like occurs.

10 Claims, 7 Drawing Sheets

(51) Int. Cl.
*G02F 1/133* (2006.01)
*G06F 1/28* (2006.01)
*G02F 1/1345* (2006.01)

(52) U.S. Cl.
CPC ... *G02F 1/13452* (2013.01); *G09G 2330/021* (2013.01); *G09G 2330/04* (2013.01)

(58) Field of Classification Search
CPC .. G09G 3/3666; G09G 3/3688; G09G 3/3696; G09G 5/00; G09G 2310/0281; G09G 2330/02; G09G 2330/021; G09G 2330/04; G09G 2330/0426; G09G 2330/12; G06F 1/28; G06F 1/32; G06F 1/3218; G06F 1/3265; G06F 3/033; G06F 3/0383; G02F 1/133; G02F 1/13306; G02F 1/1345; G02F 1/136286; H03K 5/003; H03K 5/082
See application file for complete search history.

(56) References Cited

U.S. PATENT DOCUMENTS

| | | | |
|---|---|---|---|
| 6,894,667 B1* | 5/2005 | Lin | G09G 3/3677 345/100 |
| 6,943,781 B1* | 9/2005 | Lin | G09G 3/3666 345/204 |
| 7,742,019 B2* | 6/2010 | Takahara | G09G 3/2014 345/690 |
| 2001/0040545 A1* | 11/2001 | Mishima | G09G 3/3648 345/87 |
| 2003/0067429 A1* | 4/2003 | Aoki | G02F 1/13452 345/87 |
| 2003/0122854 A1 | 7/2003 | Ooishi et al. | |
| 2004/0119824 A1* | 6/2004 | Osada | G09G 3/006 348/180 |
| 2010/0053127 A1* | 3/2010 | Takenaka | G02F 1/13452 345/204 |
| 2011/0234625 A1* | 9/2011 | Irie | G09G 3/3648 345/601 |
| 2012/0050240 A1 | 3/2012 | Tanaka et al. | |
| 2012/0075272 A1* | 3/2012 | Sasaki | G09G 3/3648 345/204 |
| 2013/0106925 A1* | 5/2013 | Sasaki | G02F 1/13306 345/690 |
| 2017/0186349 A1 | 6/2017 | Arima | |

FOREIGN PATENT DOCUMENTS

| | | |
|---|---|---|
| JP | 2003-167555 A | 6/2003 |
| JP | 2004-359023 A | 12/2004 |
| JP | 2005-077334 A | 3/2005 |
| JP | 2010-040208 A | 2/2010 |
| JP | 2012-053173 A | 3/2012 |
| JP | 2012-173598 A | 9/2012 |
| WO | 2015/125199 A1 | 8/2015 |

* cited by examiner

DISPLAY DEVICE AND POWER SUPPLY CONTROL METHOD THEREFOR

This application is a national stage of PCT/JP2016/074174 and claims priority to Japanese Application No. 2015-167380, filed on Aug. 27, 2015.

TECHNICAL FIELD

The present invention relates to a display device, and more particularly to a display device in which source lines on a display panel are driven from both ends.

BACKGROUND ART

A liquid crystal display device is widely used as a thin and low power consumption display device. The liquid crystal display device includes a liquid crystal panel, a gate driver, and a source driver. The liquid crystal panel includes a plurality of gate lines, a plurality of source lines, and a plurality of pixel circuits. The gate line, the source line, the gate driver, and the source driver are also called, for example, a scanning line, a data line, a scanning line drive circuit, and a data line drive circuit, respectively.

As a size of the liquid crystal panel becomes larger, the source line becomes longer. When the source line becomes long, a drive capability of the source driver becomes insufficient and it becomes difficult to drive the source line within a predetermined time. This problem can be solved, for example, by a method in which the drive capability of the source driver is increased. However, when this method is used, cost and power consumption of the source driver are increased. Therefore, in a liquid crystal display device having a large-sized liquid crystal panel, a method in which the source drivers are provided at both ends of the source lines and the source lines are driven from the both ends is used in some cases.

Related to the present invention, Patent Document 1 discloses a backlight device for a liquid crystal panel, the device having a tube voltage control circuit including a plurality of rectifier circuits connected in series and a plurality of MOSFETs (Metal Oxide Semiconductor Field Effect Transistors), in which an output terminal of each rectifier circuit is connected to a control terminal of each MOSFET, in order to detect abnormality of a plurality of lamps. Patent Document 2 discloses an energizing abnormality warning system for a car lamp, the system detecting a lamp in which an energization abnormality occurs based on a change in current flowing through the lamp and displaying information about the detected lamp on a display device of a car audio system. Patent Document 3 discloses providing a standby power display means for displaying a standby power of an electric device to an overcurrent warning device which detects a current flowing through a power line, displays an energization state, and issues an alarm when an overcurrent flows.

PRIOR ART DOCUMENTS

Patent Documents

[Patent Document 1] Japanese Laid-Open Patent Publication No. 2010-40208
[Patent Document 2] Japanese Laid-Open Patent Publication No. 2004-359023
[Patent Document 3] Japanese Laid-Open Patent Publication No. 2005-77334

SUMMARY OF THE INVENTION

Problems to be Solved by the Invention

The liquid crystal display device in which the source lines are driven from the both ends has a problem that when a different voltage is applied to the both ends of the source line, the liquid crystal panel or the source driver may have a fault. For example, when a connection failure occurs between a control board and a source board or when the source driver has a fault, a large difference may occur between a voltage applied to one end of the source line and a voltage applied to the other end of the source line. At this time, since a high load is applied to an output terminal of the source driver, the source driver may have a fault, and smoking or ignition may occur in a worst case.

Generally, when the connection failure or a communication error occurs in the display device, this results only in an abnormal display screen in many cases. However, there is a possibility that damage more serious than the abnormal display screen, such as destruction, smoking, ignition, and the like, may occur in the liquid crystal display device in which the source lines are driven from the both ends.

According to the backlight device disclosed in Patent Document 1, abnormality of the plurality of the lamps can be surely detected at low cost. However, according to the method disclosed in Patent Document 1, occurrence of the abnormality can only be detected afterwards, but the occurrence of the abnormality can not be prevented in advance.

Accordingly, an object of the present invention is to provide a display device in which source lines are driven from both ends, the device preventing serious damage from occurring even when a connection failure or the like occurs.

Means for Solving the Problems

According to a first aspect of the present invention, there is provided a display device including: a display panel having two opposing sides and including a plurality of source lines pulled out from the two sides; a plurality of source drivers configured to drive the source lines from both ends; one or more control boards including a power supply circuit configured to output a power supply voltage used when the source drivers drive the source lines; and two or more source boards provided between the control board and the source driver, wherein the power supply circuit is configured to switch whether to output the power supply voltage, based on a signal output from the source board to the control board.

According to a second aspect of the present invention, in the first aspect of the present invention, the control board is configured to output a connection confirmation signal to the source board, the source board is configured to output, to the control board, the connection confirmation signal output from the control board, and the power supply circuit is configured to stop outputting the power supply voltage when the connection confirmation signal output from the source board indicates abnormality.

According to a third aspect of the present invention, in the second aspect of the present invention, the control board is configured to output the connection confirmation signal having a first level to the source board and pull up or pull down the connection confirmation signal output from the source board, to a second level.

According to a fourth aspect of the present invention, in the first aspect of the present invention, the source drivers are connected in multi-stage so as to sequentially transfer a start pulse instructing a drive start, the source board is configured to output the start pulse output from the source driver in a last stage, to the control board as a drive finish signal, and the power supply circuit is configured to switch whether to output the power supply voltage, based on the drive finish signal.

According to a fifth aspect of the present invention, in the fourth aspect of the present invention, the power supply circuit is configured to stop outputting the power supply voltage when the drive finish signal does not indicate a drive finish in a predetermined cycle.

According to a sixth aspect of the present invention, in the fifth aspect of the present invention, the source driver is configured to drive corresponding source lines and output the start pulse to a next stage, when the start pulse is output from a previous stage.

According to a seventh aspect of the present invention, in the first aspect of the present invention, a plurality of the source boards configured to output a connection confirmation signal to the control board are provided, and the power supply circuit is configured to stop outputting the power supply voltage, when any of the connection confirmation signals output from the plurality of source boards indicates abnormality.

According to an eighth aspect of the present invention, in the seventh aspect of the present invention, a plurality of the control boards connected in multi-stage so as to sequentially transfer the connection confirmation signal and transfer a power supply control signal in a reverse order are provided, the control board in a stage other than a last stage is configured to output the connection confirmation signal indicating normality to a next stage when the connection confirmation signals output from a previous stage and a corresponding board all indicate normality, the control board in the last stage is configured to output the power supply control signal indicating normality to the previous stage when the connection confirmation signals output from the previous stage and the corresponding board all indicate normality, the control board in the stage other than the last stage is configured to output, to the previous stage, the power supply control signal output from the next stage, and the power supply circuit on the control board is configured to stop outputting the power supply voltage when the power supply control signal indicates abnormality.

According to a ninth aspect of the present invention, in the first aspect of the present invention, the control board and the source board are connected using a cable.

According to a tenth aspect of the present invention, in the first aspect of the present invention, the source driver is mounted on a flexible board provided between the source board and the display panel.

According to an eleventh aspect of the present invention, in the first aspect of the present invention, the display panel is a liquid crystal panel.

According to a twelfth aspect of the present invention, there is provided a method for controlling a power supply in a display device having a display panel having two opposing sides and including a plurality of source lines pulled out from the two sides, a plurality of source drivers for driving the source lines from both ends, one or more control boards including a power supply circuit for outputting a power supply voltage used when the source drivers drive the source lines, and two or more source boards provided between the control board and the source driver, the method including the steps of: outputting a signal from the source board to the control board; and controlling the power supply by switching whether to output the power supply voltage from the power supply circuit, based on the signal.

According to a thirteenth aspect of the present invention, in the twelfth aspect of the present invention, the method for controlling the power supply further includes the steps of: outputting a connection confirmation signal from the control board to the source board; and outputting, from the source board to the control board, the connection confirmation signal output from the control board, wherein in controlling the power supply, the power supply circuit stops outputting the power supply voltage when the connection confirmation signal output from the source board indicates abnormality.

According to a fourteenth aspect of the present invention, in the twelfth aspect of the present invention, when the source drivers are connected in multi-stage so as to sequentially transfer a start pulse instructing a drive start, a step of outputting the start pulse output from the source driver in a last stage, from the source board to the control board as a drive finish signal is further provided, and in controlling the power supply, the power supply circuit switches whether to output the power supply voltage, based on the drive finish signal.

According to a fifteenth aspect of the present invention, in the twelfth aspect of the present invention, when the display device includes a plurality of the source boards for outputting a connection confirmation signal to the control board, in controlling the power supply, the power supply circuit stops outputting the power supply voltage, when any of the connection confirmation signals output from the plurality of the source boards indicates abnormality.

Effects of the Invention

According to the first or twelfth aspect of the present invention, it is possible to stop a supply of the power supply voltage used for driving the source lines at the time of abnormality, by switching whether to output the power supply voltage used when the source drivers drive the source lines, based on the signal output from the source board to the control board. Therefore, it is possible to prevent serious damage from occurring even when a connection failure or the like occurs in the display device in which the source lines are driven from the both ends.

According to the second or thirteenth aspect of the present invention, it is possible to detect occurrence of a connection failure between the control board and the source board by exchanging the connection confirmation signal between the control board and the source board. It is possible to prevent serious damage from occurring by stopping the supply of the power supply voltage used for driving the source lines when the connection failure is detected.

According to the third aspect of the present invention, it is possible to easily detect the occurrence of the connection failure between the control board and the source board, by outputting the connection confirmation signal having the first level from the control board and pulling up or pulling down the connection confirmation signal output from the source board, to the second level on the control board.

According to the fourth or fourteenth aspect of the present invention, it is possible to detect that the connection failure occurs between the control board and the source board, or that the source driver has a fault. It is possible to prevent serious damage from occurring by stopping the supply of the power supply voltage used for driving the source lines when the connection failure or the fault of the source driver is detected.

According to the fifth aspect of the present invention, the fault of the source driver can be detected based on whether the drive finish signal indicates the drive finish at the predetermined cycle.

According to the sixth aspect of the present invention, the drive finish signal indicates the drive finish after the source drivers connected in multi-stage drive all of the corresponding source lines. The fault of the source driver can be detected using such a drive finish signal.

According to the seventh or fifteenth aspect of the present invention, it is possible to detect the occurrence of the connection failure between the control board and any of the source boards in the display device having the plurality of the source boards. It is possible to prevent serious damage from occurring by stopping the supply of the power supply voltage used for driving the source lines when the connection failure is detected.

According to the eighth aspect of the present invention, it is possible to detect the occurrence of the connection failure between any of the control boards and any of the corresponding boards in the display device having the plurality of the control boards. It is possible to prevent serious damage from occurring by stopping the supply of the power supply voltage used for driving the source lines when the connection failure is detected.

According to the ninth aspect of the present invention, it is possible to prevent serious damage from occurring even when the connection failure or the like occurs in the display device in which the control board and the source board are connected using the cable.

According to the tenth aspect of the present invention, it is possible to prevent serious damage from occurring even when the connection failure or the like occurs in the display device in which the source driver is mounted on the flexible board.

According to the eleventh aspect of the present invention, it is possible to prevent serious damage from occurring even when the connection failure or the like occurs in the liquid crystal display device in which the source lines are driven from the both ends.

MODES FOR CARRYING OUT THE INVENTION

First Embodiment

Figure 1:
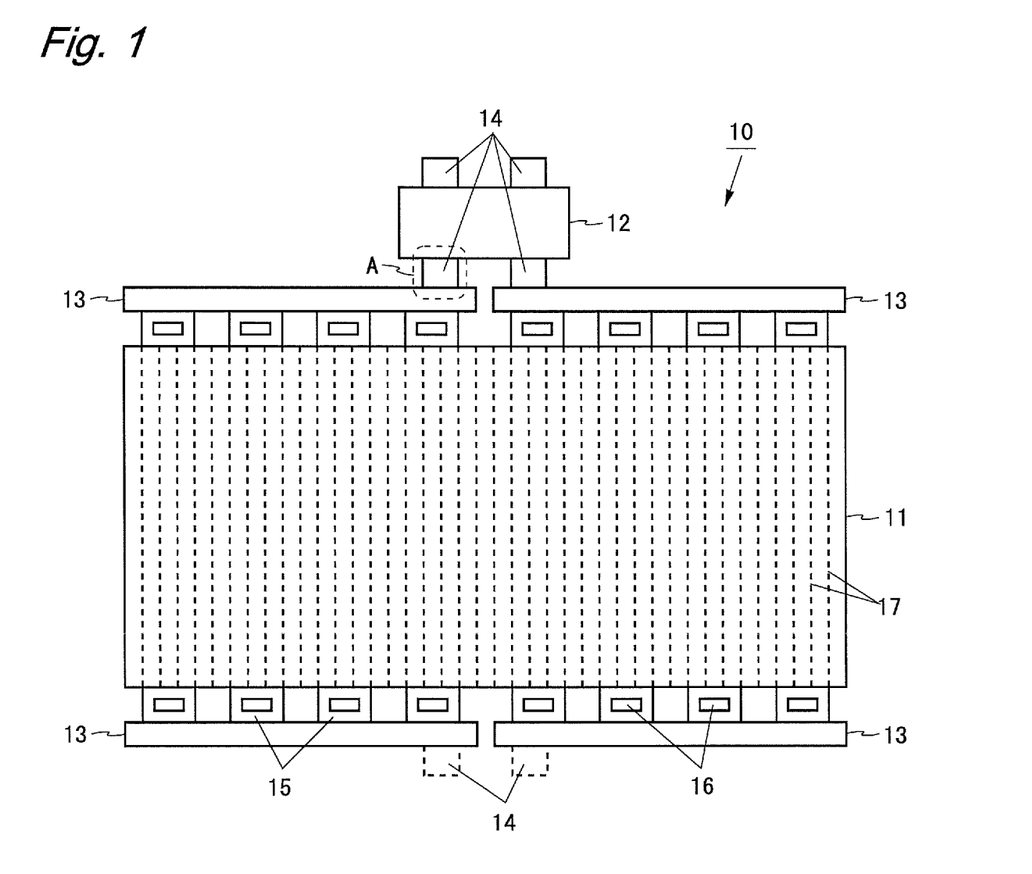
FIG. 1 is a diagram showing a configuration of a liquid crystal display device according to a first embodiment of the present invention.

FIG. 1 is a diagram showing a configuration of a liquid crystal display device according to a first embodiment of the present invention. A liquid crystal display device 10 shown in FIG. 1 includes a liquid crystal panel 11, a control board 12, a plurality of source boards 13, a plurality of flexible flat cables (hereinafter referred to as FFCs) 14, a plurality of flexible boards 15, a plurality of source drivers 16, and a gate driver (not shown). In FIG. 1, the number of the source boards 13 is four, the number of FFCs 14 is four, the number of the flexible boards 15 is sixteen, and the number of the source drivers 16 is sixteen. These numbers may be arbitrary.

The liquid crystal panel 11 is a display panel having an upper side, a lower side, a left side, and a right side. The upper side and the tower side are opposed to each other, and the left, side and the right side are opposed to each other. The liquid crystal panel 11 includes a plurality of gate lines (not shown), a plurality of source lines 17, and a plurality of pixel circuits (not shown). The gate lines are arranged in parallel with the upper side and the lower side of the liquid crystal panel 11. The source lines 17 are arranged in parallel with the left side and the right side of the liquid crystal panel 11. The pixel circuits are arranged corresponding to intersections of the gate lines and the source lines 17.

The control board 12 and the source board 13 are connected using the FFC 14. The liquid crystal panel 11 and the source board 13 are connected using the flexible board 15. The liquid crystal panel 11 and the flexible board 15 are crimp-connected, and the source board 13 and the flexible board 15 are also crimp-connected. The source driver 16 is mounted on the flexible board 15. In this manner, the source board 13 is provided between the control board 12 and the source driver 16.

The gate driver drives the gate lines. For example, two gate drivers may be provided along the left side and the right side of the liquid crystal panel 11, and the two gate drivers may drive the gate lines from both ends. Alternatively, one gate driver for driving the gate lines from left ends or right ends may be provided along the left side or the right side of the liquid crystal panel 11. Alternatively, each gate line may be divided into a left half and a right half at a center of the liquid crystal panel 11, a gate driver for driving left-half gate lines from the left ends may be provided along the left side of the liquid crystal panel 11, and a gate driver for driving right-half gate lines from the right ends may be provided along the right side of the liquid crystal panel 11.

The source drivers 16 drive the source lines 17 from the both ends. More specifically, each source line 17 is pulled out from the upper side and the lower side of the liquid crystal panel 11. An upper end of the source line 17 is connected to the source driver 16 provided on the upper side of the liquid crystal panel 11, and a lower end of the source line 17 is connected to the source driver 16 provided on the lower side of the liquid crystal panel 11. Each source line 17 is driven from the both ends using the two source drivers 16.

A power supply circuit, a timing control circuit (both not shown) and the like are mounted on the control board 12. In the following, there will be a focus on the power supply circuit mounted on the control board 12 and outputting a power supply voltage used when the source drivers 16 drive the source lines 17. The timing control circuit supplies a control signal to the gate driver and supplies a control signal and a video signal to the source driver 16. The signal and the power supply voltage supplied from circuits on the control board 12 to the source driver 16 are output from the control board 12, pass through the FFC 14, the source board 13, and the flexible board 15, and reach the source driver 16.

Note that FIG. 1 describes that the control board 12 is connected only to the two source boards 13 via the two FFCs 14. However, in reality, the control board 12 is also connected to other two source boards 13 via other two FFCs 14 (see a broken line portion in FIG. 1).

Figure 2:
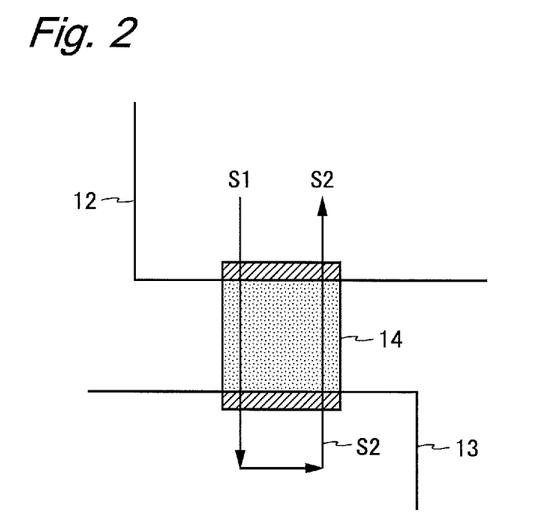
FIG. 2 is a diagram showing a connection confirmation signal in the liquid crystal display device shown in FIG. 1.

FIG. 2 is a diagram showing a connection confirmation signal in the liquid crystal display device 10. FIG. 2 depicts portion A of FIG. 1 in an enlarged manner. In the following drawings, a hatched portion represents a connector provided to the control board 12 or the source board 13. As shown in FIG. 2, the control board 12 outputs a connection confirmation signal S1 to the source board 13 via the FFC 14. The source board 13 outputs a connection confirmation signal S2 to the control board 12 via the FFC 14. In the source board 13, the connection confirmation signal S1 and the connection confirmation signal S2 are short-circuited. In this manner, the source board 13 outputs the connection confirmation signal S1 output from the control board 12 as it is to the control board 12 as the connection confirmation signal S2. Different terminals are used between when the connection confirmation signal S1 is output from the control board 12 and when the connection confirmation signal S2 is output from the source board 13.

Figure 3:
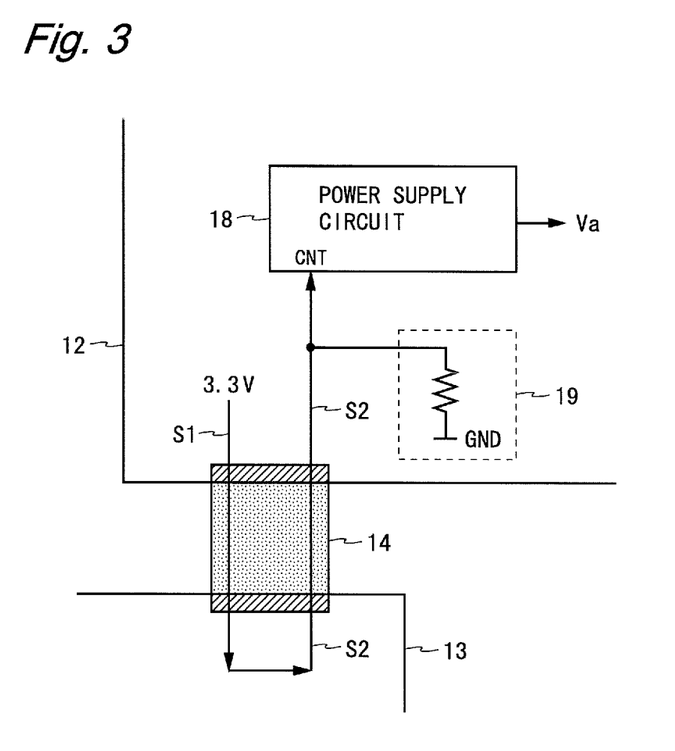
FIG. 3 is a diagram showing a method for controlling a power supply in the liquid crystal display device shown in FIG. 1.

FIG. 3 is a diagram showing a method for controlling a power supply in the liquid crystal display device 10. As shown in FIG. 3, a high-level voltage (here, 3.3 V) is applied to the connection confirmation signal S1 on the control board 12. The connection confirmation signal S1 output from the control board 12 is output from the source board 13 as it is as the connection confirmation signal S2. The control board 12 includes a power supply circuit 18 and a pull-down circuit 19. The connection confirmation signal S2 is supplied to a control terminal CNT of the power supply circuit 18 and is connected to the pull-down circuit 19. The power supply circuit 18 switches whether to output a power supply voltage Va used when the source drivers drive the source lines 17, based on the connection confirmation signal S2 output from the source board 13. More specifically, the power supply circuit 18 outputs the power supply voltage Va when the connection confirmation signal S2 is at a high level, and stops outputting the power supply voltage Va when the connection confirmation signal S2 is at a low level.

Figure 4A:
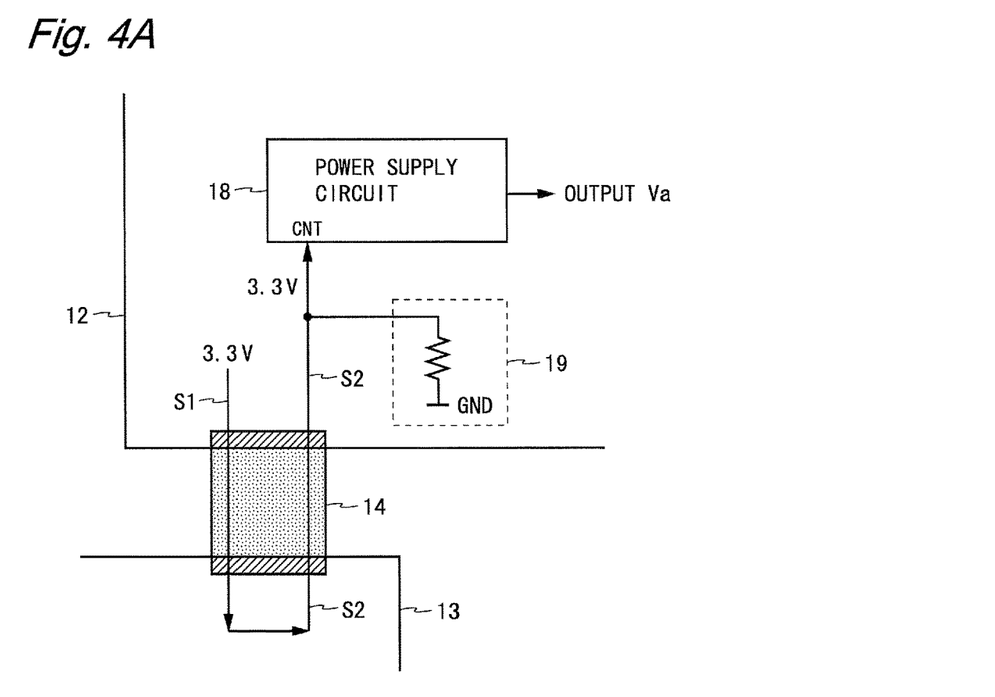
FIG. 4A is a diagram showing a state of the liquid crystal display device shown in FIG. 1 when it is normal.

FIG. 4A is a diagram showing a state of the liquid crystal display device 10 when it is normal. When the control board and the source board 13 are connected correctly, the connection confirmation signal S2 becomes the high level (voltage is 3.3 V). In this case, the power supply circuit 18 outputs the power supply voltage Va used when the source drivers 16 drive the source lines 17, based on the high-level connection confirmation signal S2. The power supply voltage Va output from the power supply circuit 18 is supplied to the source driver 16 and the liquid crystal panel 11 via the FFC 14 and the source board 13.

Figure 4B:
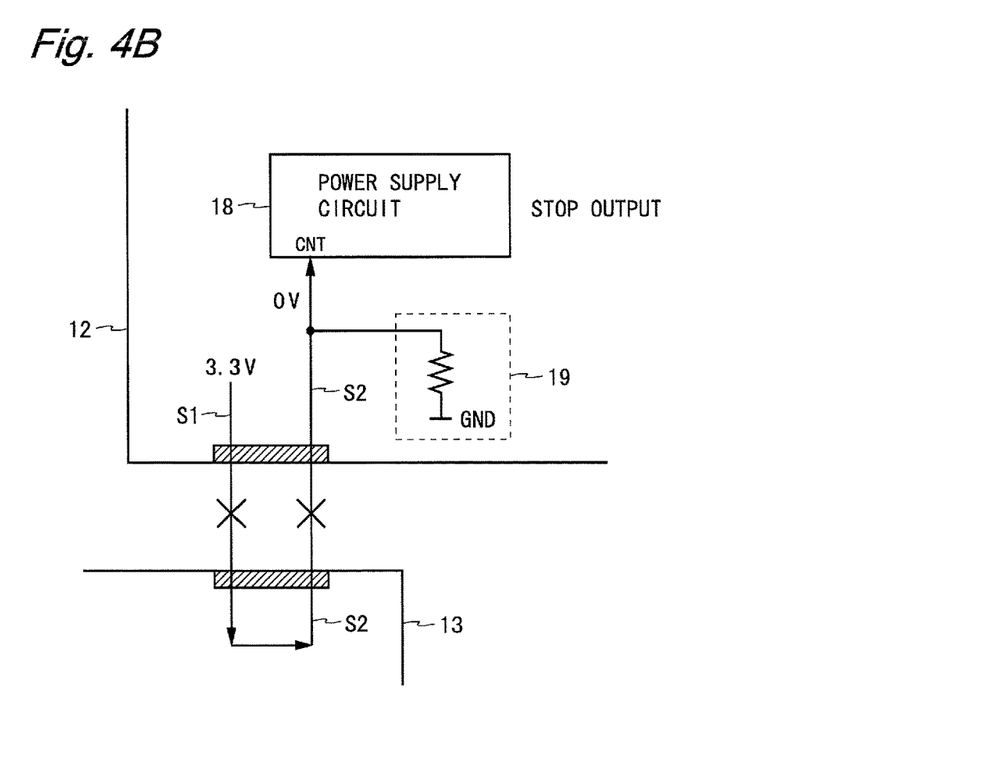
FIG. 4B is a diagram showing the state of the liquid crystal display device shown in FIG. 1 when a connection failure occurs.

FIG. 4B is a diagram showing the state of the liquid crystal display device 10 when a connection failure occurs. The connection failure may occur between the control board 12 and the source board 13 when the FFC 14 is not inserted into the connector correctly, for example. In this case, the connection confirmation signal S2 becomes the low level (voltage is 0 V) by an action of the pull-down circuit 19. The power supply circuit 18 stops outputting the power supply voltage Va used when the source drivers 16 drive the source lines 17, based on the low-level connection confirmation signal S2. At this time, since the power supply voltage Va is not supplied to the source driver 16 and the liquid crystal panel 11, an overcurrent does not flow through the source driver 16. Therefore, it is possible to prevent smoking and ignition from the source driver 16 and prevent a fault of the liquid crystal panel 11, when the connection failure occurs between the control board 12 and the source board 13.

Furthermore, since a fault of the liquid crystal panel 11 due to an operation mistake in a manufacturing process of the liquid crystal display device 10 can be prevented, a yield ratio of the liquid crystal display device 10 can be improved. Furthermore, since it is only necessary to monitor a voltage level of a signal, this method can be easily applied to various kinds of display devices, regardless of a communication system between the timing control circuit on the control board 12 and the source driver 16.

As described above, the liquid crystal display device 10 according to the present embodiment includes a display panel (liquid crystal panel 11) having two opposing sides (upper side and lower side) and including a plurality of the source lines 17 pulled out from the two sides, a plurality of the source drivers 16 for driving the source lines 17 from the both ends, the control board 12 including the power supply circuit 18 for outputting the power supply voltage Va used when the source drivers 16 drive the source lines 17, and a plurality of the source boards 13 provided between the control board 12 and the source driver 16. The power supply circuit 18 switches whether to output the power supply voltage Va, based on a signal (connection confirmation signal S2) output from the source board 13 to the control board 12. In this manner, it is possible to stop a supply of the power supply voltage used for driving the source lines at the time of abnormality, by switching whether to output the power supply voltage used when the source drivers drive the source lines, based on the signal output from the source board to the control board. Therefore, it is possible to prevent serious damage from occurring even when the connection failure or the like occurs in the liquid crystal display device in which the source lines are driven from the both ends.

Furthermore, the control board 12 outputs the connection confirmation signal S1 having a first level (high level) to the source board 13, and the source board 13 outputs, to the control board 12, the connection confirmation signal S1 output from the control board 12, and the control board 12 pulls down the connection confirmation signal output from the source board 13, to a second level (low level). When the connection confirmation signal S2 output from the source board 13 indicates abnormality (in the case of low level), the power supply circuit 18 stops outputting the power supply voltage Va used when the source drivers 16 drive the source lines 17. In this manner, it is possible to detect occurrence of the connection failure between the control board and the source board by exchanging the connection confirmation signal between the control board and the source board. In particular, it is possible to easily detect the occurrence of the connection failure between the control board and the source board, by outputting the connection confirmation signal having the first level from the control board and pulling down the connection confirmation signal output from the source board, to the second level on the control board.

Furthermore, the control board 12 and the source board 13 are connected using a cable (FFC 14), and the source driver 16 is mounted on the flexible board 15 provided between the source board 13 and the display panel. In this manner, it is possible to prevent serious damage from occurring even when the connection failure or the like occurs, in the liquid crystal display device in which the control board and the source board are connected using the cable or the liquid crystal display device in which the source driver is mounted on the flexible board.

Note that in the above description, the control board 12 outputs the high-level connection confirmation signal S1 and pulls down the connection confirmation signal S2 to the low level. Alternatively, the control board 12 may output a low-level connection confirmation signal S1 and pulls up the connection confirmation signal S2 to the high level. In this variant, the power supply circuit 18 stops outputting the power supply voltage Va used when the source drivers 16 drive the source lines 17, when the connection confirmation signal S2 is at the high level.

Second Embodiment

A liquid crystal display device according to a second embodiment of the present invention has a configuration similar (FIG. 1) to that of the liquid crystal display device 10 according to the first embodiment. However, the liquid crystal display device according to the present embodiment includes a control board 21 and source boards 22 shown in FIG. 5, in place of the control board 12 and the source boards 13. Hereinafter, among the components of each embodiment, the same components as those of a previously described embodiment are provided with the same reference numerals, and a description thereof is omitted.

Figure 5:
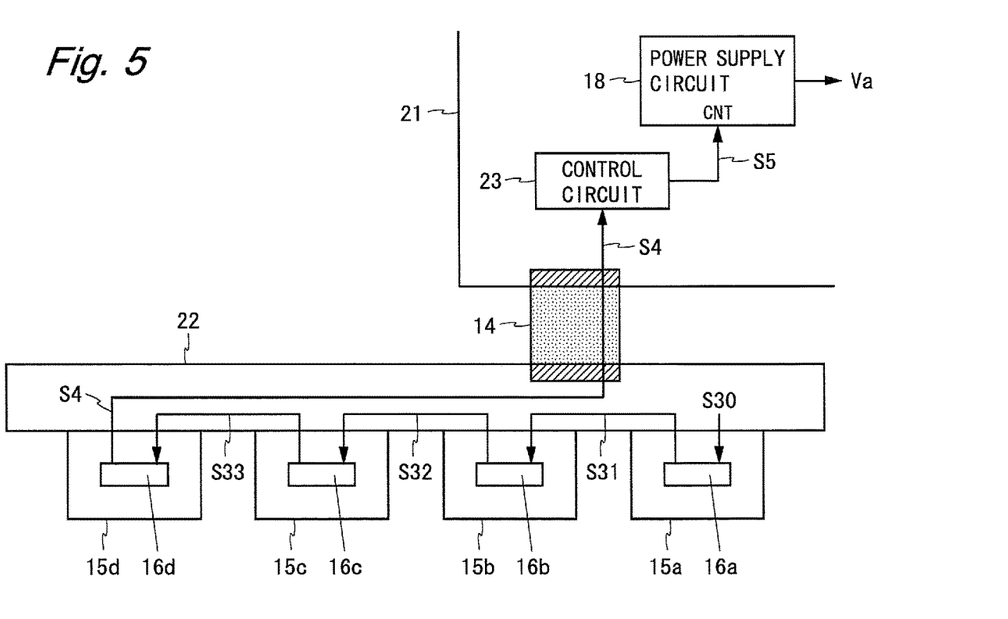
FIG. 5 is a diagram showing a method for controlling a power supply in a liquid crystal display device according to a second embodiment of the present invention.

FIG. 5 is a diagram showing a method for controlling a power supply in the liquid crystal display device according to the present embodiment. FIG. 5 depicts the source board 22 provided in an upper-left portion of the liquid crystal panel and its peripheral circuits. The source board 22 is connected to four flexible boards 15a to 15d. The source drivers 16a to 16d are mounted on the flexible boards 15a to 15d, respectively.

The source drivers 16a to 16d are connected in multistage so as to sequentially transfer a start pulse instructing a drive start. More specifically, each of the source drivers 16a to 16d has a first terminal for inputting the start pulse and a second terminal for outputting the start pulse. A start pulse S30 generated on the source board 22 is given to the first terminal of the source driver 16a. The second terminals of the source drivers 16a to 16c are connected to the first terminals of the source drivers 16b to 16d, respectively. In the liquid crystal display device according to the present embodiment, a digital power supply for operating a digital circuit portion of the source drivers 16a to 16d is supplied to the source drivers 16a to 16d by a method not shown.

Hereinafter, the start pulses output from the source drivers 16a to 16c are referred to as S31 to S33 respectively, and the start pulse output from the source driver 16d is referred to as a drive finish signal S4. Furthermore, it is assumed that the start pulses S30 to S33 become the high level when instructing the drive start, and the drive finish signal S4 becomes the high level when indicating a drive finish.

When a high-level start pulse S30 is output from the source board 22, the source driver 16a drives corresponding source lines (not shown) on the liquid crystal panel and outputs a high-level start pulse S31 to the source driver 16b. The source drivers 16b, 16c operate in a manner similar to that in the source driver 16a. When a high-level start pulse S33 is output from the source driver 16c, the source driver 16d in a last stage drives corresponding source lines and outputs a high-level drive finish signal S4. The drive finish signal S4 becomes the high level when drive of the source lines by the source drivers 16a to 16d all finishes.

The source board 22 outputs the drive finish signal S4 output from the source driver 16d in the last stage, to the control board 21 via the FFC 14. The drive finish signal S4 is supplied to a control circuit 23 on the control board 21. The control circuit 23 outputs a power supply control signal S5 to be supplied to a control terminal CNT of the power supply circuit 18, based on the drive finish signal S4 and other control signals (not shown). When the drive finish signal S4 becomes the high level at a predetermined cycle (for example, every line time), the control circuit 23 outputs a high-level power supply control signal S5 indicating normality, and outputs a low-level power supply control signal S5 indicating abnormality otherwise. When the power supply control signal S5 is at the high level, the power supply circuit 18 outputs the power supply voltage Va used when the source drivers 16a to 16d drive the source lines. When the power supply control signal S5 is at the low level, the power supply circuit 18 stops outputting the power supply voltage Va.

Figure 6A:
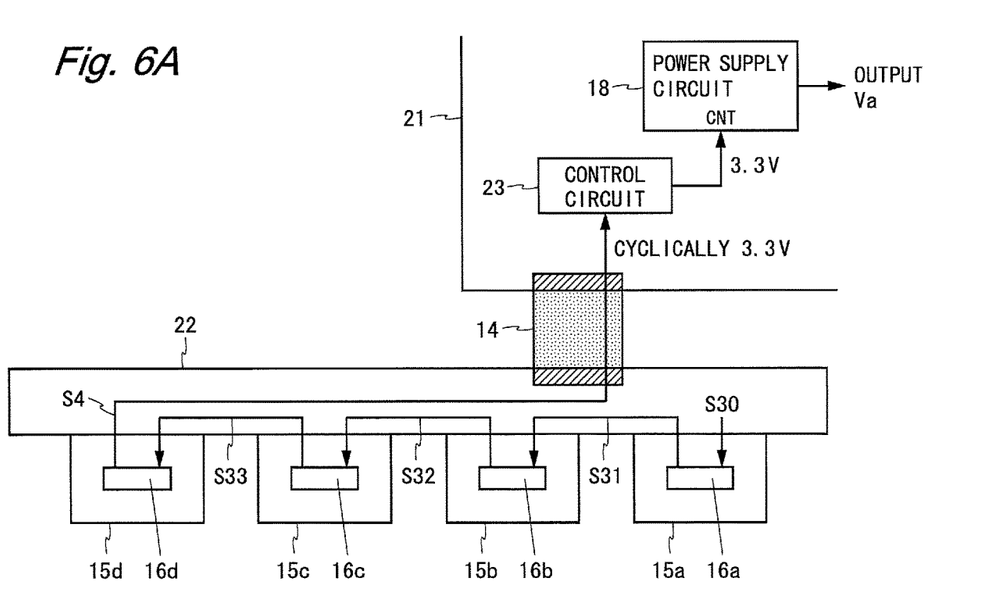
FIG. 6A is a diagram showing a state of the liquid crystal display device according to the second embodiment when it is normal.

FIG. 6A is a diagram showing a state of the liquid crystal display device according to the present embodiment when it is normal. When the control board 21 and the source board 22 are connected correctly and the source drivers 16a to 16d all operate correctly, the drive finish signal S4 becomes the high level at a predetermined cycle and the power supply control signal S5 becomes the high level. In this case, the power supply circuit 18 outputs the power supply voltage Va used when the source drivers 16a to 16d drive the source lines, based on the high-level power supply control signal S5. The power supply voltage Va output from the power supply circuit 18 is supplied to the source drivers 16a to 16d and the liquid crystal panel via the FFC 14 and the source board 22.

Figure 6B:
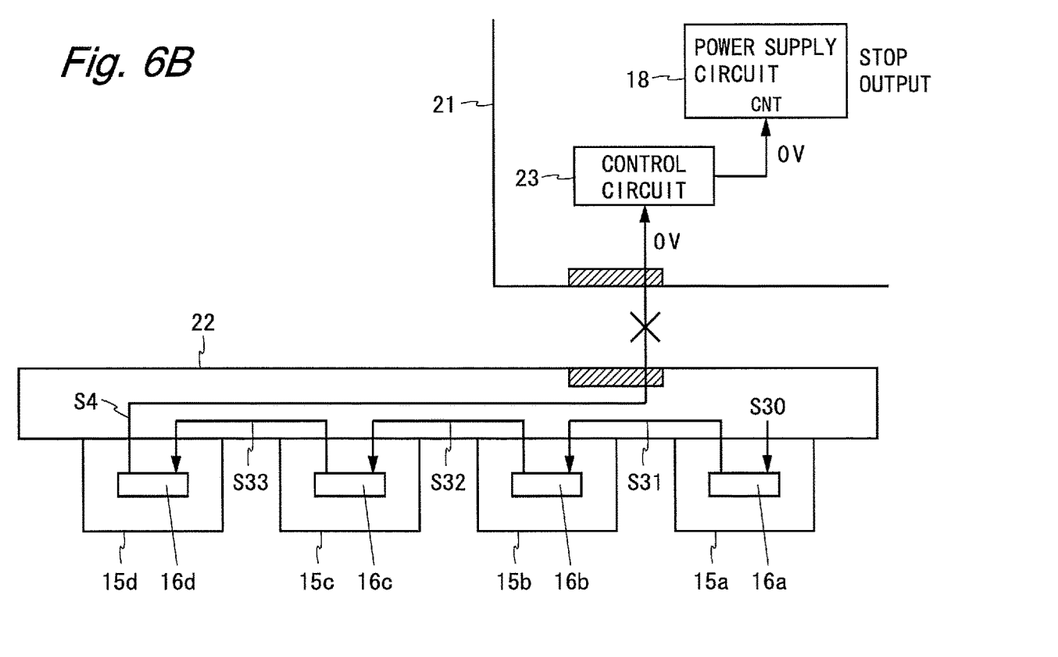
FIG. 6B is a diagram showing the state of the liquid crystal display device according to the second embodiment when a connection failure occurs.
Figure 6C:
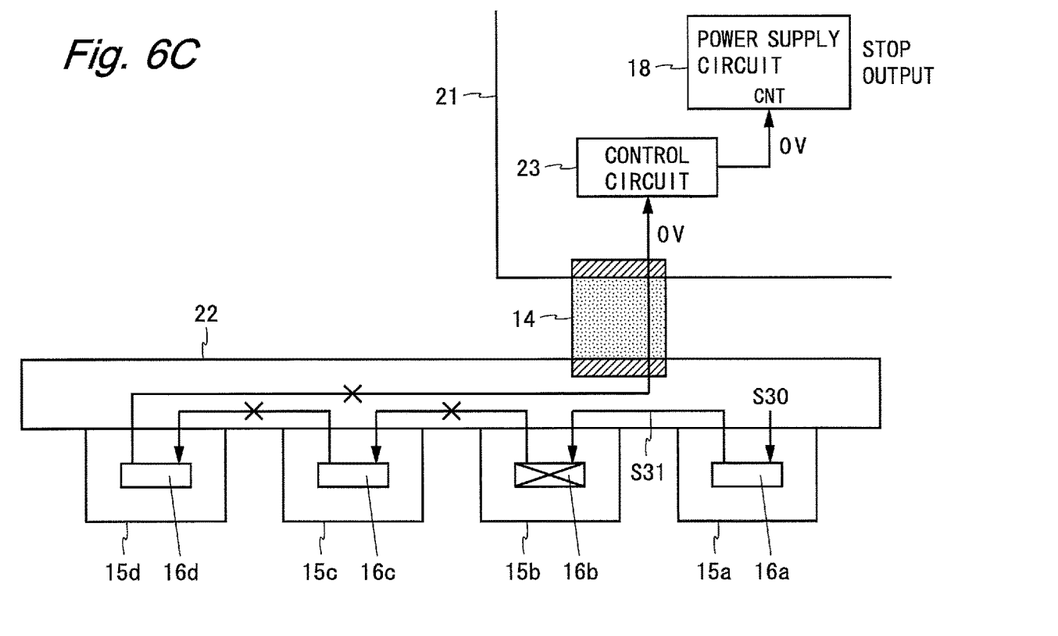
FIG. 6C is a diagram showing the state of the liquid crystal display device according to the second embodiment when a source driver has a fault.

FIG. 6B is a diagram showing the state of the liquid crystal display device according to the present embodiment when a connection failure occurs. FIG. 6C is a diagram showing the state of the liquid crystal display device according to the present embodiment when a source driver has a fault. FIG. 6C depicts the state when the source driver 16b has the fault. When the connection failure occurs between the control board 21 and the source board 22 (FIG. 6B), the drive finish signal S4 becomes the low level and the power supply control signal S5 also becomes the low level. The same holds true in a case where any of the source drivers 16a to 16d has a fault (FIG. 6C). In these cases, the power supply circuit 18 stops outputting the power supply voltage Va used when the source drivers 16 drive the source lines 17, based on the low-level power supply control signal S5. At this time, since the power supply voltage Va is not supplied to the source drivers 16a to 16d and the liquid crystal panel, an overcurrent does not flow through the source drivers 16a to 16d.

Therefore, as with the first embodiment, it is possible to prevent smoking and ignition from the source drivers 16a to 16d and prevent a fault of the liquid crystal panel when the connection failure occurs between the control board 21 and the source board 22. In addition, it is also possible to prevent the smoking and the ignition from the source drivers 16a to 16d and prevent the fault of the liquid crystal panel even in a case where any of the source drivers 16a to 16d has the fault.

As described above, in the display device according to the present embodiment, the source drivers 16a to 16d are connected in multi-stage so as to sequentially transfer the start pulse instructing the drive start, the source board 22 outputs the start pulse output from the source driver 16d in the last stage, to the control board 21 as the drive finish signal S4, and the power supply circuit 18 switches whether to output the power supply voltage Va used when the source drivers 16a to 16d drive the source lines, based on the drive finish signal S4. Therefore, it is possible to detect that the connection failure occurs between the control board and the source board, or that the source driver has the fault. It is possible to prevent serious damage from occurring by stopping the supply of the power supply voltage used for driving the source lines when the connection failure or the fault of the source driver is detected.

Furthermore, when the drive finish signal S4 does not indicate the drive finish at the predetermined cycle, the power supply circuit 18 stops outputting the power supply voltage Va used when the source drivers 16a to 16d drive the source lines. In this manner, the fault of the source driver can be detected based on whether the drive finish signal indicates the drive finish at the predetermined cycle. Furthermore, the source drivers 16a to 16d drive corresponding source lines and output the start pulse to the next stage, when the start pulse is output from the previous stage. Therefore, the drive finish signal indicates the drive finish after the source drivers connected in multi-stage drive all of the corresponding source lines. The fault of the source driver can be detected using such a drive finish signal.

In the above description, the start pulses S30 to S33 are at the high level when indicating the drive start, the drive finish signal S4 is at the high level when indicating the drive finish, and the power supply control signal S5 becomes the high level when indicating normality. Polarities of the start pulses S30 to S33, the drive finish signal S4, and the power supply control signal S5 may be opposite to those in the above example.

Third Embodiment

A liquid crystal display device according to a third embodiment of the present invention has a configuration similar (FIG. 1) to that of the liquid crystal display device 10 according to the first embodiment. However, the liquid crystal display device according to the present embodiment includes a control board 31 shown in FIG. 7, in place of the control board 12.

Figure 7:
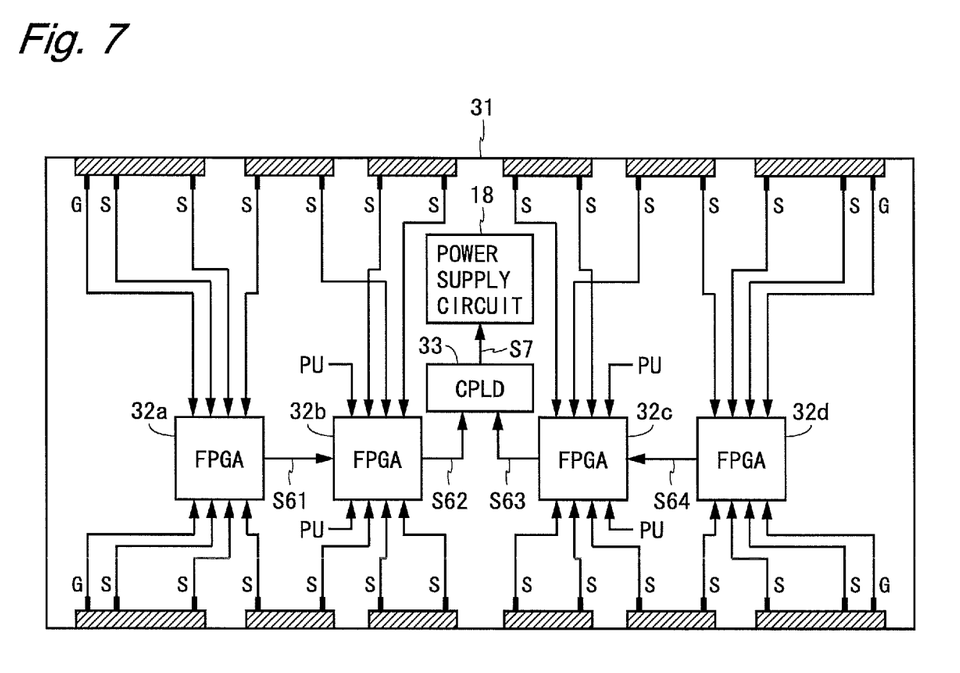
FIG. 7 is a diagram showing a method for controlling a power supply in a liquid crystal display device according to a third embodiment of the present invention.

FIG. 7 is a diagram showing a method for controlling a power supply in the liquid crystal display device according to the present embodiment. The control board 31 shown in FIG. 7 is used, being connected to a plurality of gate boards and a plurality of source boards (not shown). The control board 31 includes a plurality of connectors (hatched portions), four FPGAs (Field Programmable Gate Arrays) 32a to 32d, a CPLD (Complex Programmable Logic Device) 33, and the power supply circuit 18. The number of connectors is twelve in FIG. 7. This number may be arbitrary.

Each of the gate boards and the source boards connected to the control board 31 outputs a high-level connection confirmation signal. The connection confirmation signals output from the gate boards and the source boards are input to the FPGAs 32a to 32d via the connectors. FIG. 7 depicts 28 pieces of the connection confirmation signals output from the gate boards and the source boards. A signal with a symbol "G" indicates a connection confirmation signal output from the gate board, and a signal with a symbol "S" indicates a connection confirmation signal output from the source board. Furthermore, a signal with a symbol "PU" indicates a pulled-up signal (voltage is 3.3 V). The connection confirmation signal is connected to a pull-down circuit (not shown) provided on the control board 31. Thus, the connection confirmation signal becomes the high level when indicating normality and becomes the low level when indicating abnormality.

Two connection confirmation signals output from the gate boards and six connection confirmation signals output from the source boards are input to the FPGA 32a. The FPGA 32a outputs a high-level connection confirmation signal S61 when the eight connection confirmation signals are all at the high level, and outputs a low-level connection confirmation signal S61 otherwise. The connection confirmation signal S61 and six connection confirmation signals output from the source boards are input to the FPGA 32b. The FPGA 32b outputs a high-level connection confirmation signal S62 when the seven connection confirmation signals are all at the high level, and outputs a low-level connection confirmation signal S62 otherwise. The FPGA 32d operates in a manner similar to that in the FPGA 32a, and the FPGA 32c operates in a manner similar to that in the FPGA 32b.

When both of the connection confirmation signals S62, S63 are at the high level, the CPLD 33 outputs a high-level power supply control signal S7 indicating normality, and outputs a low-level power supply control signal S7 indicating abnormality otherwise. When the power supply control signal S7 is at the high level, the power supply circuit 18 outputs the power supply voltage used when the source drivers drive the source lines. When the power supply control signal S7 is at the low level, the power supply circuit 18 stops outputting the power supply voltage used when the source drivers drive the source lines.

In the liquid crystal display device according to the present embodiment, when the control board 31 and a plurality of boards (gate boards and source boards) are to be connected, it is checked whether the control board 31 and all of the boards are connected correctly. When the control board 31 and all of the boards are connected correctly, the power supply control signal S7 becomes the high level and the power supply circuit 18 outputs the power supply voltage used when the source drivers drive the source lines. When a connection failure or the like occurs between the control board 31 and any of the boards, the power supply control signal S7 becomes the low level and the power supply circuit 18 stops outputting the power supply voltage used when the source drivers drive the source lines.

As described above, the liquid crystal display device according to the present embodiment includes a plurality of the source boards for outputting the connection confirmation signal to the control board 31. When any of the connection confirmation signals output from the plurality of source boards indicates abnormality, the power supply circuit 18 stops outputting the power supply voltage used when the source drivers drive the source lines. Therefore, it is possible to detect the occurrence of the connection failure between the control board and any of the source boards in the liquid crystal display device having the plurality of source boards. It is possible to prevent serious damage from occurring by stopping the supply of the power supply voltage used for driving the source lines when the connection failure is detected.

In the above description, each of the gate boards and the source boards outputs the high-level connection confirmation signal, and the control board 31 pulls down the connection confirmation signal output from these boards, to the low level. Alternatively, each of the gate boards and the source boards may output a low-level connection confirmation signal, and the control board 31 may pull up the connection confirmation signal output from these boards, to the high level. Furthermore, polarities of the connection confirmation signals S61 to S64 and the power supply control signal S7 may be opposite to those in the above example.

Figure 8:
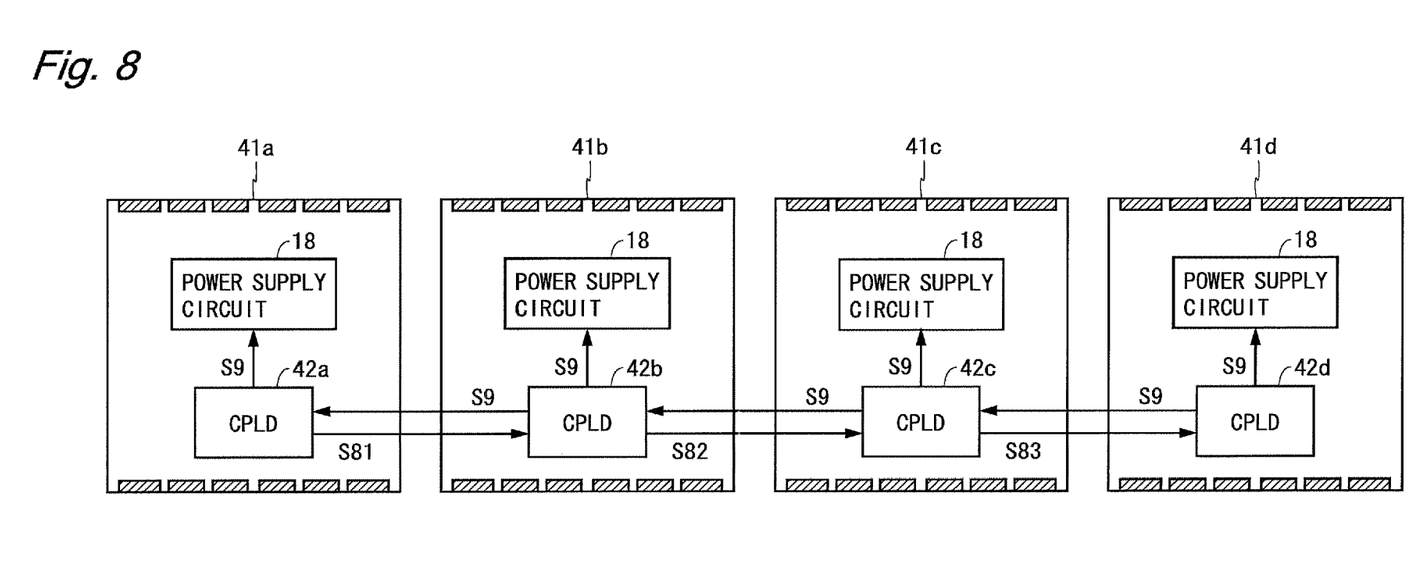
FIG. 8 is a diagram showing a method for controlling a power supply in a liquid crystal display device according to a variant of the third embodiment.

As for the liquid crystal display device according to the present embodiment, a following variant can be configured. FIG. 8 is a diagram showing a method for controlling a power supply in a liquid crystal display device according to the variant of the present embodiment. The liquid crystal display device according to the present variant includes four control boards 41a to 41d.

The control board 41a has a configuration similar to that of the control board 31 shown in FIG. 7. The control board 41a includes a plurality of connectors (shaded portions), a plurality of FPGAs (not shown), a CPLD 42a, and the power supply circuit 18, and is connected to a plurality of gate boards and a plurality of source boards (both not shown). Each of the gate boards and the source boards outputs a high-level connection confirmation signal to the control board 41a. The control boards 41b to 41d have a configuration similar to that of the control board 41a.

The control boards 41a to 41d are connected in multi-stage so as to sequentially transfer a connection confirmation signal and transfer a power supply control signal in a reverse order. The control boards 41a to 41c in stages other than a last stage output a connection confirmation signal indicating normality to a next stage, when the connection confirmation signals output from a previous stage and corresponding boards all indicate normality. The control board 41d in a final stage outputs a power supply control signal S9 indicating normality, when the connection confirmation signals output from the previous stage and the corresponding boards all indicate normality. The control boards 41a to 41c in the stages other than the last stage output, to the previous stage, the power supply control signal S9 output from the next stage.

More specifically, the CPLD 42a on the control board 41a outputs a high-level connection confirmation signal S81 when the plurality of the connection confirmation signals output from the corresponding boards are all at the high level, and outputs a low-level connection confirmation signal S81 otherwise. The CPLD 42b on the control board 41b outputs a high-level connection confirmation signal S82 when the connection confirmation signals output from the corresponding boards and the connection confirmation signal S81 are all at the high level, and outputs a low-level connection confirmation signal S82 otherwise. The CPLD 42c on the control board 41c operates in a manner similar to that in the CPLD 42b. The CPLD 42d on the control board 41d outputs a high-level power supply control signal S9 when the connection confirmation signals output from the corresponding boards and the connection confirmation signal S83 are all at high level, and outputs a low-level power supply control signal S9 otherwise. The power supply control signal S9 output from the CPLD 42d is transferred in an order of the CPLDs 42c, 42b, and 42a.

The power supply circuits 18 on the control boards 41a to 41d operate based on the power supply control signal S9 output from the CPLDs 42a to 42d, respectively. When the power supply control signal S9 is at the high level, the power supply circuit 18 outputs the power supply voltage used when the source drivers drive the source lines. When the power supply control signal S9 is at the low level, the power supply circuit 18 stops outputting the power supply voltage used when the source drivers drive the source lines.

In the liquid crystal display device according to the present variant, the power supply control signal S9 becomes the high level when the four control boards 41a to 41d and the corresponding boards are all connected correctly, and becomes the low level otherwise. Therefore, it is possible to detect the occurrence of the connection failure between any of the control boards and any of the corresponding boards in the liquid crystal display device having the plurality of control boards. It is possible to prevent serious damage from occurring by stopping the supply of the power supply voltage used for driving the source lines when the connection failure is detected.

Note that the present invention can be applied not only to a liquid crystal display device in which source lines on a display panel are driven from both ends, but also to a display device other than the liquid crystal display device.

The present application is an application claiming a priority based on Japanese Patent Application No. 2015-167380 filed on Aug. 27, 2015 entitled "Display device and power supply control method therefore", and the contents of this application are incorporated by reference in the present application.

INDUSTRIAL APPLICABILITY

Since the display device of the present invention has a feature that source lines are driven from both ends and the device can prevent serious damage from occurring even when a connection failure or the like occurs, the device can be used for various kinds of display devices such as a liquid crystal display device.

DESCRIPTION OF REFERENCE CHARACTERS

10: LIQUID CRYSTAL DISPLAY DEVICE
11: LIQUID CRYSTAL PANEL
12, 21, 31, 41: CONTROL BOARD
13, 22: SOURCE BOARD
14: FFC
15: FLEXIBLE BOARD
16: SOURCE DRIVER
17: SOURCE LINE
18: POWER SUPPLY CIRCUIT
19: PULL-DOWN CIRCUIT
23: CONTROL CIRCUIT
32: FPGA
33, 42: CPLD

The invention claimed is:
1. A display device comprising:
a display panel having two opposing sides and including a plurality of source lines pulled out from the two sides;
a plurality of source drivers configured to drive the source lines from both ends;
one or more control boards including a power supply circuit configured to output a power supply voltage used when the source drivers drive the source lines; and two or more source boards provided between the control board and the source driver, wherein the source drivers are connected in multi-stage so as to sequentially transfer a start pulse instructing a drive start, the source board is configured to output the start pulse output from the source driver in a last stage, to the control board as a drive finish signal, and the power supply circuit is configured to switch whether to output the power supply voltage, based on the drive finish signal.

2. The display device according to claim 1, wherein the power supply circuit is configured to stop outputting the power supply voltage when the drive finish signal does not indicate a drive finish in a predetermined cycle.

3. The display device according to claim 2, wherein the source driver is configured to drive corresponding source lines and output the start pulse to a next stage, when the start pulse is output from a previous stage.

4. The display device according to claim 1, wherein the control board and the source board are connected using a cable.

5. The display device according to claim 1, wherein the source driver is mounted on a flexible board provided between the source board and the display panel.

6. The display device according to claim 1, wherein the display panel is a liquid crystal panel.

7. A display device comprising:

a display panel having two opposing sides and including a plurality of source lines pulled out from the two sides;

a plurality of source drivers configured to drive the source lines from both ends;

a plurality of control boards including a power supply circuit configured to output a power supply voltage used when the source drivers drive the source lines; and two or more source boards provided between the control board and the source driver and configured to output a connection confirmation signal to the control board, wherein the control boards are connected in multi-stage so as to sequentially transfer the connection confirmation signal and transfer a power supply control signal in a reverse order, the control board in a stage other than a last stage is configured to output the connection confirmation signal indicating normality to a next stage when the connection confirmation signals output from a previous stage and a corresponding board all indicate normality, the control board in the last stage is configured to output the power supply control signal indicating normality to the previous stage when the connection confirmation signals output from the previous stage and the corresponding board all indicate normality, the control board in the stage other than the last stage is configured to output, to the previous stage, the power supply control signal output from the next stage, and the power supply circuit on the control board is configured to stop outputting the power supply voltage, when any of the connection confirmation signals output from the plurality of source boards indicates abnormality by stopping outputting the power supply voltage when the power supply control signal indicates abnormality.

8. The display device according to claim 7, wherein the control board and the source board are connected using a cable.

9. The display device according to claim 7, wherein the source driver is mounted on a flexible board provided between the source board and the display panel.

10. The display device according to claim 7, wherein the display panel is a liquid crystal panel.

* * * * *